F. F. TERRY.
Hay-Fork.

No. 64,381. Patented Apr. 30, 1867.

Witnesses:

Inventor:

United States Patent Office.

FAYETTE F. TERRY, OF PORT GIBSON, NEW YORK

Letters Patent No. 64,381, dated April 30, 1867

SHANK AND SOCKET FOR HAND HAY-FORKS.

*The Schedule referred to in these Letters Patent and making part of the same.*

TO ALL WHOM IT MAY CONCERN:

Be it known that I, FAYETTE F. TERRY, of Port Gibson, in the county of Ontario, and State of New York, have invented certain new and useful "Improvements in Hand Hay-Forks;" and I do hereby declare that the following is a full, clear, and exact description thereof, reference being had to the accompanying drawings, making part of this specification, in which—

Like letters indicate corresponding parts.

Figure 1:
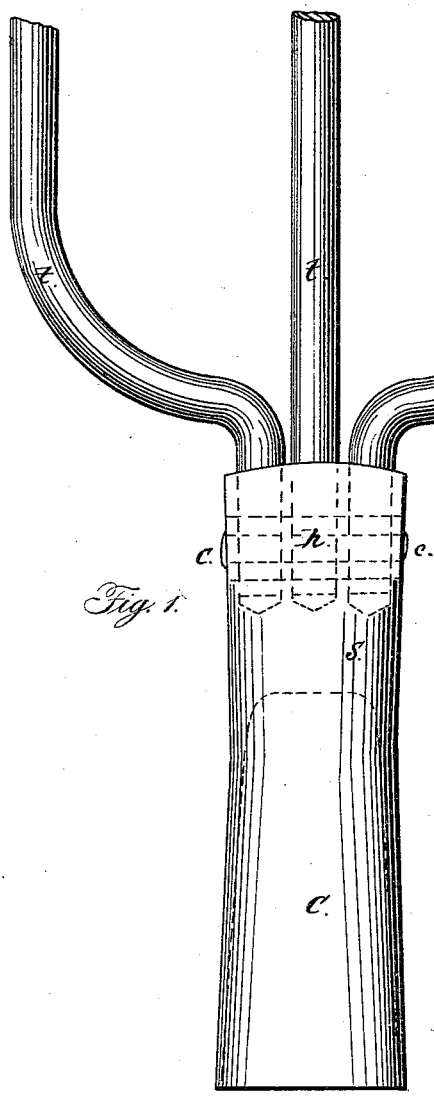
Figure 1 is a face view of my invention, a portion of the tines being broken away.
Figure 2:
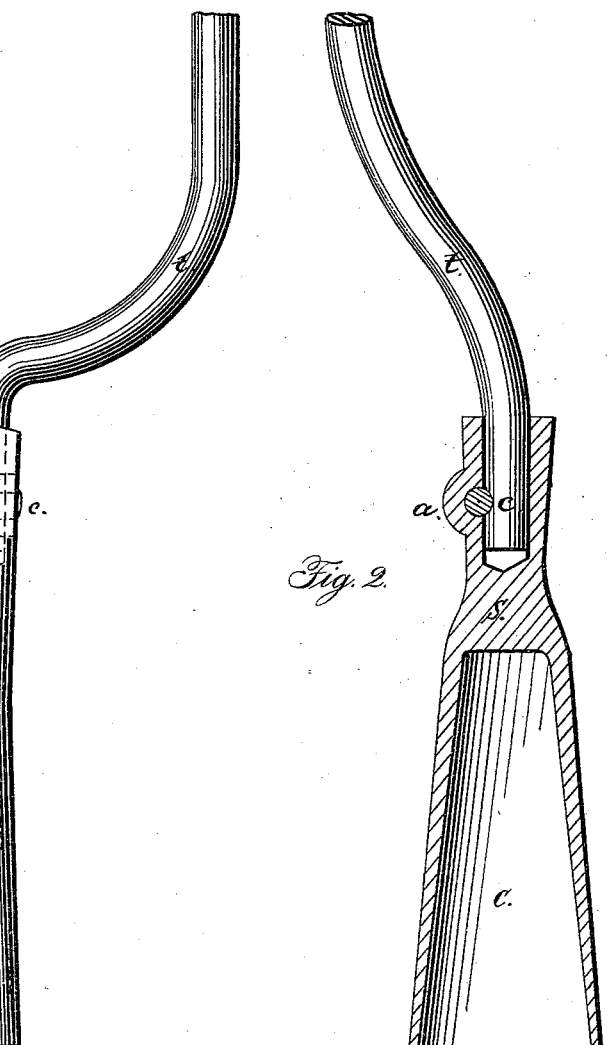
Figure 2 is a longitudinal section in the plane of the red line $x$ in fig. 1.

This invention relates to that class of hand-hay-forks having detachable wire tines; and its nature consists in making the handle socket or ferrule and the tine-receiving shank in one piece of metal, and also in providing the receiving shank with round holes for the reception of the tines as they are cut from the wire, without any forging or fitting being required, and in securing them in position by means of a suitable key or keys.

To enable others to make and use my invention, I will describe its construction and operation.

I make the socket or ferrule, C, of any desired length and size to receive the end of the wooden handle, and to the outer end of this metallic ferrule I make the solid metal head, $h$, in which are drilled, or otherwise formed, separate holes to receive the ends of the tines, $t$. After they are properly pointed the shank ends are inserted in the holes in the shank S, with no other preparation than removing the bur, should there be any formed in cutting up the wire, which is done with a file or an ordinary rose-centring bur. When the tines are arranged in the shank, there may be a hole drilled through from side to side of the shank, under the enlargement or rib $a$, in such a manner as to cut slightly into the side of the tine shanks. Through this hole I drive the clamping key, $c$, which may be slightly headed or riveted at each end. There might be a square hole cored through the shank to receive a square key, as shown in the drawings, but I prefer a round-drilled hole. The holes might be drilled transversely through the head or shank S, as indicated by the dotted lines $i$, the keys passing between the tines, in which case two or more keys would have to be used in each head.

What I claim as my invention, and desire to secure by Letters Patent, is—

1. Locking the several tines, $t$, to the shank or head S, by a single key, substantially in the manner herein shown and described, and for the purposes set forth.

2. Providing the head or shank S with round holes to receive the wire tines $t$, as and for the purposes shown and described.

3. The arrangement of the handle-socket or ferrule C, in connection with the receiving-shank S, as and for the purposes herein set forth.

F. F. TERRY.

Witnesses:
 WM. S. LOUGHBOROUGH,
 P. T. TURNER.